Nov. 29, 1932.  H. I. LEA  1,889,254

STILL

Filed May 14, 1930  2 Sheets-Sheet 1

Inventor.
Henry. I. Lea.

Attorney.

Nov. 29, 1932. H. I. LEA 1,889,254

STILL

Filed May 14, 1930 2 Sheets-Sheet 2

Inventor
Henry. I. Lea

Attorney.

Patented Nov. 29, 1932

1,889,254

UNITED STATES PATENT OFFICE

HENRY I. LEA, OF SANTA MONICA, CALIFORNIA

STILL

Application filed May 14, 1930. Serial No. 452,258.

This invention has reference to distillation apparatus of the general character described in my copending application on distillation system, Ser. No. 275,437, filed May 5, 1928, the present application being a continuation in part of the first filed application, and also embodying various features of improvement over the apparatus described therein.

In order that the objects of the present invention may be understood most clearly, I shall first describe briefly the general characteristics of the apparatus disclosed in my earlier application, and then refer to the particular features of improvement with which the present invention is concerned. It may be stated that both inventions have for their primary object to provide distillation systems of highest efficiency by retaining and recycling within the system a maximum amount of the heat required for distillation; and although such efficiency may be attained by the apparatus described in my first filed application, the apparatus with the present application deals, by virtue of improved features in design and adaptability for heating with hot gases, is in many respects better suited for the commercial distillation of large quantities of liquid.

High efficiency in distillation operations is accomplished in accordance with the method and apparatus described in Ser. No. 275,437, by a still construction providing a liquid carrying condenser which directly surrounds an inner elongated vapor space, and a heated evaporator extending longitudinally and centrally within the vapor space enclosed by the condenser. Liquid to be distilled is passed through the condenser wherein it is preheated substantially to boiling temperature by heat exchange with the vapors liberated from the evaporator and condensed on the surrounding condenser walls, the preheated feed then being conducted from the condenser to one end of the evaporator from whence it is subjected to vaporization in being passed longitudinally along the evaporator. The liquid preferably is heated over a part length only of the evaporator, and thereafter is subjected to extended and intimate exposure to the vapor space so as to promote further vaporization at the expense of the sensible heat of the liquid, and to the end that the unvaporized residuum will approach as closely as possible the feed liquid temperature. Substantially the entire amount of heat of vaporization, or that given up by the condensing vapors, is recovered in preheating the feed, and, neglecting heat losses from the apparatus, such heat is maintained in a closed distillation cycle with obvious resultant operating efficiency bringing about low fuel consumption and cost of distillation.

In my application Ser. No. 275,437, I show an electrically heated evaporator unit within the condenser, comprising a vertical series of liquid carrying trays, the liquid within which is heated and vaporized by an electrically heated tube extending through the trays. It is one purpose of the present invention to provide an evaporator unit within which the liquid may be heated and vaporized by hot combustion gases introduced to the evaporator at an intermediate longitudinal point, and conducted through the trays of that section of the evaporator within which the liquid is subjected to heating. In order to adapt the evaporator for heating by oil or gaseous fuel, I have developed an improved form of evaporator within which is provided a combustion chamber at an intermediate point therein, the construction being such as to permit the hot combustion gases to be passed directly from the combustion chamber through an upper series of heating trays. For the purpose of obtaining maximum heat efficiency in the system, I preferably preheat the air taken into the combustion chamber at the expense of heat contained within the residual liquid flowing through the series of trays below the combustion chamber, by conducting the air upwardly through the lower series of trays and in intimate heat transfer relation with the hot residual liquid.

I have provided in accordance with my present invention an improved tray construction which is particularly adapted to accomplish the heating of the liquid within the trays by hot combustion gases, and to preheat the air taken into the combustion chamber in the manner described. As will later be seen, the evaporator trays are designed with the view of obtaining the same high degree of efficiency in the heating operation, as is accomplished in the operation of condensing the vapors and transferring the heat of condensation to the feed liquid. The above and additional objects of the invention and features of improvement will be explained to best advantage in the following detailed description of a typical and preferred embodiment of the invention. Reference is had for purposes of description to the accompanying drawings, in which:

Figure 1:
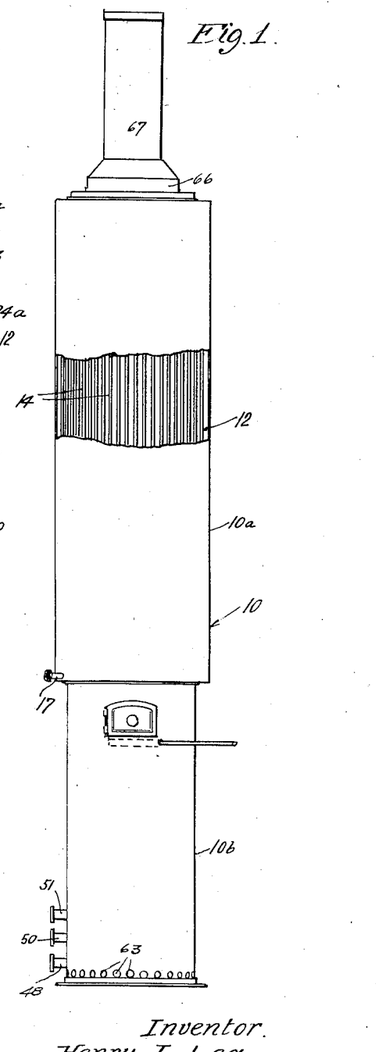
Fig. 1 is a general view of my improved form of still, a portion of the upper shell section being broken away to show the interior arrangement of condenser tubes and evaporator trays.
Figure 2:
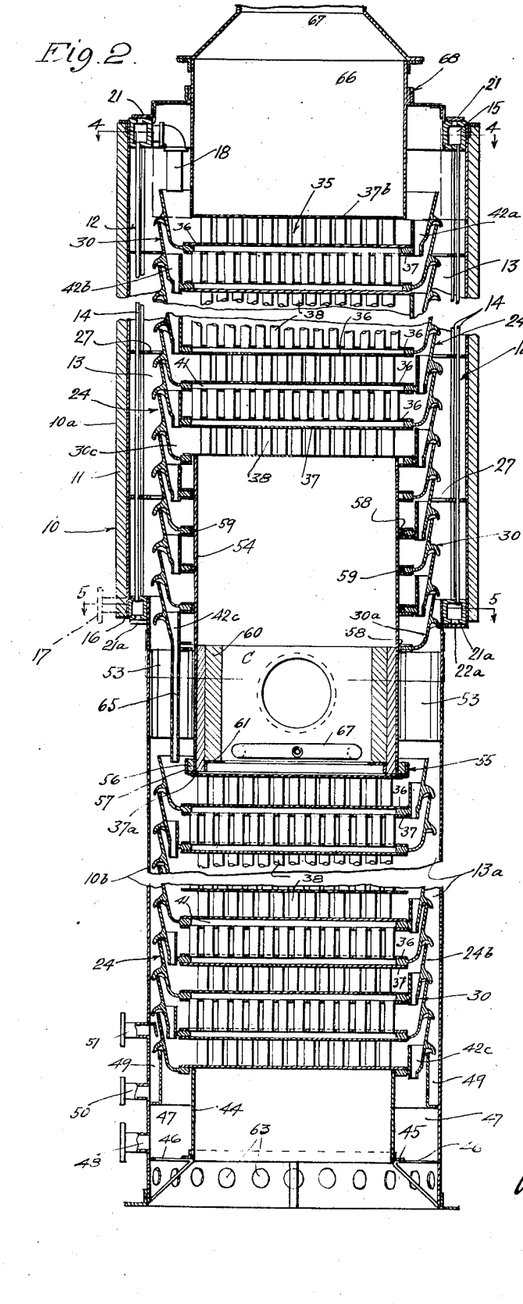
Fig. 2 is an enlarged vertical sectional view of the apparatus.

Referring first to Figs. 1 and 2, the apparatus comprises a shell, generally indicated at 10, consisting of upper and lower sections 10a and 10b, respectively, the upper section 10a preferably, though not necessarily, being of somewhat larger diameter than the lower section, in order to accommodate the condenser tubes. The upper shell section is thermally insulated by lagging 11, the lower section however being exteriorly exposed to the atmosphere, reasons for which will presently appear. Within section 10a of the shell is a liquid carrying condenser, generally indicated at 12, in tubular formation which directly surrounds an inner elongated vapor chamber 13 which is continuous with vapor chamber 13a within the lower shell section 10b.

It will be understood that in the broad aspects of my invention, condenser 12 may be of any suitable design or construction which will provide condensing surfaces surrounding the interior vapor chamber 13. Preferably however in order to provide a maximum area of condensing surface for the purpose of bringing about rapid and efficient heat transfer between the vapors in chamber 13 and liquid being conducted through the condenser, the latter is constructed in the form of a plurality of more or less closely spaced vertical tubes 14 arranged so as to surround the vapor chamber 13. Tubes 14 terminate at their upper and lower ends in annular headers 15 and 16, and liquid to be distilled is taken into the lower header 16 through inlet 17, and thence conducted upwardly through the tubes into the upper header, from which it is discharged into the upper end of the evaporator, hereinafter described, through outlet 18. Preferably a series of baffles 20 and 20a will be placed in proper relation in headers 15 and 16 respectively so as to cause the feed liquid introduced through inlet 17 to follow a series of passes through the condenser tubes before being discharged to the evaporator, the baffle arrangement shown being typically such as to direct the liquid through seven sections of tubes in its flow through the condenser. Headers 15 and 16 are provided with removable plates 21, and 21a covering openings 22, 22a in the walls of the headers opposite the ends of the tubes, in order that the tubes may be accessible for cleaning without necessitating their removal from the still. Thus should the inside of the tubes become clogged or corroded by solids or impurities in the liquid, the cover plates may be removed and a reamer run through the tubes by way of openings 22 and 22a.

The condenser tubes 14 extend through openings 26 in annular flanges 27 welded to the inside of the shell 10a. Longitudinal expansion of the tubes due to heating is permitted by allowing the tubes to bend longitudinally in proportion to the amount of expansion, openings 26 in flanges 27 being of sufficient size to accommodate maximum flexure of the tubes.

The preheated feed liquid is delivered through the outlet to the upper end of an evaporator, generally indicated at 24, extending longitudinally and centrally through the vapor chambers 13 and 13a. The evaporator may be characterized as comprising an upper heating section, to which heat is supplied as will later be described, and within which the preheated feed is initially subjected to heating and vaporization. The vapors liberated from the upper heating section 24a of the evaporator into chamber 13 are condensed on the surfaces of condenser tubes 12, the heat of condensation being transferred to the feed liquid being passed through the tubes. A comparatively small portion of the vapors may condense on the wall of the upper shell section, but in such slight amounts due to the shell being thoroughly insulated, as to occasion no considerable heat losses from the system. Preferably no extraneous heat is supplied to the lower section 24b of the evaporator, the hot and partially vaporized liquid from the upper section 24a instead being subjected to extended surface exposure within the atmosphere of vapor chamber 13a so as to promote vaporization within section 24b at the expense of the sensible heat of the residual liquid, as will more fully appear hereinafter. The vapors given off from the lower evaporator section, and any vapors from the upper section of the still that may not condense on the tubes 14, are condensed on the inner surface of the lower air cooled shell section 10b. Further details of the construction and operation of the evaporator will be taken up to best advantage at a later point.

In my earlier filed application, Ser. No. 275,437, hereinabove referred to, I show one form of still construction in which the liquid carrying condenser, comprising a series of tubes surrounding an interior vapor condenser, comprising a series of tubes surrounding an interior vapor chamber, extends substantially the full length of the shell, although, for reasons that will presently appear, I have shown the liquid carrying condenser 12 in the present apparatus to extend only a part length of the still and substantially the length of the upper heating section of the evaporator, it may be mentioned that should it be desired, and operating conditions permitting, the condenser may be extended the full length of the shell, as shown in Ser. No. 275,437, or through any part length thereof.

I may state at this point that the length of the liquid carrying condenser 12 may be determined in accordance with the amount of evaporation taking place in that section of the evaporator which it surrounds, so that the heat taken up by the feed liquid will be substantially that required to heat it to the boiling temperature. It will be understood that as the amount of vaporization increases, the amount of heat transferred to the feed liquid within the condenser will likewise increase; and the relation between the heat of condensation given up by the vapors upon condensing, and the amount of heat required to raise the feed liquid to boiling temperature, will be such that vaporization within the evaporator in excess of a certain proportionate amount of the feed, will cause the available heat of condensation to exceed that required to raise the feed to the boiling temperature. Should the conditions be such that the feed liquid in any portion of the condenser is preheated to the boiling temperature by the condensing vapors, that portion of the condenser will of course be ineffective to produce condensation. Therefore, assuming the amount of vaporization to exceed that required to preheat the feed to boiling temperature, the length of the condenser will be determined so that the feed liquid will be heated to boiling temperature only at substantially the point of delivery to the evaporator, further cooling required to entirely condense the vapors taking place on the walls of the lower air-cooled shell section 10b. In the event the amount of vaporization from the evaporator does not exceed that required to heat the feed to boiling temperature, the condenser 12 may be extended downwardly so as to enclose the full length of the evaporator and thereby effect the transference to the feed liquid of the entire amount of heat of condensation of the vapors.

It will be noted that the upper liquid carrying condenser 12 and the lower shell section 10b form in effect, a continuous condenser, since the cooling of the exposed shell section by the air will be sufficient to cause the condensation on its inner surface of vapors in chamber 13a given off from the lower section of the evaporator, and if necessary, a portion of the vapors from the upper section. Although in some cases it may be desirable to provide additional cooling facilities for the lower shell section, such as by jacketing it and passing cooling liquid through the jacket, I prefer to cool the lower portion of the shell by exposure to the atmosphere as illustrated.

The evaporator 24 is made up of a series of superposed trays through which the feed liquid is caused to flow downwardly and laterally in opposite directions within successive trays. The trays 30 comprising the lower evaporator section 24b and those above the lower end portion of the upper section 24a, are of similar construction and arrangement, the construction of trays 30a at the lower end of the upper section and around the firing chamber C however being somewhat modified to accommodate the firing chamber, as will hereinafter appear. Each of trays 30 comprises an annular body 31, which may conveniently be cast, the sides 31a thereof being inwardly inclined toward the bottom of the tray. On the outer surface of the sides is formed an annular downwardly curved flange or skirt 32, within the under side of which is formed a plurality of spaced ribs 33. It will be noted that the formation of the tray body, including the outer flange and ribs, is such as to be particularly well suited for construction as a single casting, and preferably it will be so formed.

Figures 3, 4:
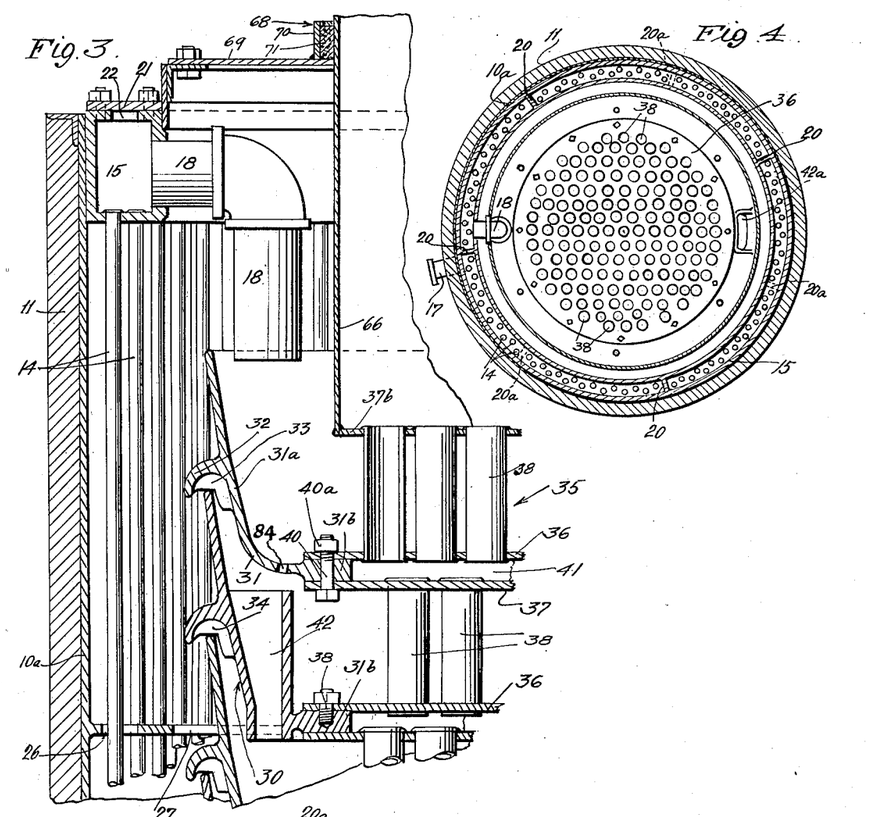
Fig. 3 is a fragmentary enlarged view showing the condenser and tray construction and arrangement at the upper end of the apparatus, as generally indicated at F³ in Fig. 2.
Fig. 4 is a transverse section on broken line 4—4 of Fig. 2.

As shown most clearly in Fig. 3, each tray is supported on the one next below by resting ribs 33 of the upper tray on the top edge of the tray below, the ribs thus serving to provide spaces at 34 between the edges of the trays and flanges 32, through which vapors liberated from the liquid being heated within the trays may escape into the vapor chamber surrounding the evaporator. Flanges 33 are curved downwardly preferably to a point slightly below the upper edge of the tray next below in order to preclude any possibility of condensed liquid particles within the surrounding vapor chamber or on the condenser tubes from dropping or splattering back into the trays.

Each of the trays 30 contains what may be termed a heating floor structure through which the liquid flows transversely within the trays, and which is so constructed as to permit the liquid to be heated and vaporized by hot gases passed upwardly through the trays from the firing chamber, or to be cooled by air taken into the chamber. The heating floor 35 within each tray comprises a pair of vertically spaced plates 36 and 37, the lower of which is bolted to the top side of the inner annular flange 31b of the body 31 of the tray, by means of stud bolts 38 carried by the flange. Plates 36 and 37 in addition to defining the heating floors, serve as tube sheets carrying a nest of comparatively short vertical tubes 38, the ends of which are expanded into openings in the plates. Preferably and typically tubes 38 will be about 2½ inches in diameter and will be fairly closely spaced over the entire surface of the plates surrounded by flange 31b, so as to provide an aggregate large cross sectional area to permit unrestricted flow of combustion gases through the several floors, and to provide a large heating surface area to which the liquid within the tray is exposed.

Successive tray assemblies are held together by means of bolts 40, the heads of which are spot welded to the undersides of plates 37, and which extend upwardly through holes in flange 31b and in the floor plate 36 next above. Thus in assembling the evaporator trays within the shell, each tray may be lowered on top the one next below and over bolts 40, and the successive tray assemblies tied together by nuts 40a. It will be noted that the plates 36 of each tray and the upper plate 37 of the one next below are spaced apart at 41 a distance corresponding to the thickness of flange 31b. As clearly shown in Fig. 3, the tubes 38 of successive trays are arranged in staggered relation, this being done in order to cause turbulent flow of the hot gases being passed upwardly through the tubes, to the end of effecting maximum heat transfer to the liquid within the trays. Thus the gases after flowing through a tube 38 of comparatively short length, are caused to divert their flow within space 41 before passing into one of the tubes next above. This prevents any tendency for the formation within the tubes of a central core of gas at a temperature higher than the surrounding gases in contact with the walls of the tube, as might be the case should the tubes be extended continuously through the trays or be arranged in exact alinement and the gases allowed to flow in a stream line through the tubes.

A liquid overflow passage within each tray is formed by casting integral tubular down spouts 42 therein, the upper overflow edge of the down spout in each floor in the evaporator section above the combustion chamber C being slightly above the bottom surface of the upper floor plate 37, and the down spouts being arranged at opposite sides of successive trays in order to cause the liquid to flow across the trays in opposite directions. It will be noted that the overflow edge of the down spout in each floor below the combustion chamber C, terminates slightly below the bottom surface of the floor plate 37 immediately above. Thus the preheated feed liquid delivered from the upper condenser manifold 15 through outlet pipe 18 to the uppermost tray is caused to flow transversely across the tray between plates 36 and 37 and in intimate contact with the heated surfaces of tubes 38, to the opposite side of the plate, from whence the liquid overflows through down spout 42a into the tray next below. The liquid then passes in a reverse direction to the opposite side of the second tray, where it overflows through 42b into the tray next below, and so on down through the evaporator.

It will be noted that the level of the top overflow edges of the down spouts in the trays of the upper evaporator section, are at substantially the level of the bottom surface of the upper floor plates 37. The liquid within the trays is thus maintained in contact with plates 37, so as to expose the liquid in the upper evaporator section to a maximum area of heating surfaces, that is the surfaces of both plates 36 and 37 and tubes 38 throughout their entire extents between the plates. The top overflow edges of the down spouts within the trays of the lower evaporator section however are spaced some distance below plates 37, thereby providing a vapor space between the surface of the liquid in the trays and the floor plates thereabove to give a maximum surface exposure of the liquid and thereby promote vaporization by virtue of extended surface exposure of the liquid throughout its flow through the lower evaporator section. By thus providing for maintaining the liquid within the trays of the upper and lower sections at differential levels in the manner described, the liquid in the upper heated tray units or elements is maintained in maximum contact with the heat transfer surfaces and with a minimum evaporative surface, and the liquid in the lower trays is maintained in lesser contact with the heat transfer surfaces and with a relatively larger evaporative surface.

As shown in Fig. 2, the trays of the lower section 24b of the evaporator rest on the upper end of a shell 44 joined at its lower edge to an annular bottom plate 45 welded to the outer shell 10b. Shell 44 and the bottom plate 45 are supported by brackets 46 or other suitable means beneath plate 45. It may be mentioned at this point that the residual liquid from the lowermost tray overflows through down spout 42c into the annular space 47 between shells 44 and 10b, the liquid thence being taken from the still through outlet 48. The distilled condensate flowing down the inner wall of the lower shell section 10b is collected in an annular trough 49 welded to the inside of the shell, and is taken off through outlet 50. In case it is desired to carry out the distillation at pressures other than atmospheric, such pressures may be applied to the interior of the apparatus through line 51.

Joined to the inner side of the shell 10b above the upper end of the lower evaporator section 24b is a plurality of circularly spaced brackets or ribs 53 upon which is supported the upper evaporator section 24a, the lowermost tray thereof resting on the upper edge of the brackets. Extending from the lower evaporator section upwardly through brackets 53 and through a number of the bottom trays of the upper evaporator section, is a cylindrical shell 54 which forms the fire box or combustion chamber. The construction of the evaporator trays 30a is modified to accommodate the fire box shell, the interiors of the tray floors being cut out to permit shell 54 to be lowered through the trays. The upper end of shell 54 is welded to the bottom of the lowermost tube carrying tray 30c of the upper section 24a, the lower end of the shell projecting within an expansion or slip joint, generally indicated at 55, comprising an annular packing 56 carried within ring 57 welded to the upper floor plate 37a of the lower evaporator section. Thus longitudinal expansion of the lower section 24b due to heating, is permitted by the slip joint at 55, as will be readily apparent. Shell 54 fits fairly snugly within the openings 58 in tray 30a, and if it is desired, packing 59 may be placed between the annular floor plates of trays 30a to prevent leakage along the exterior of shell 54.

Figure 5:
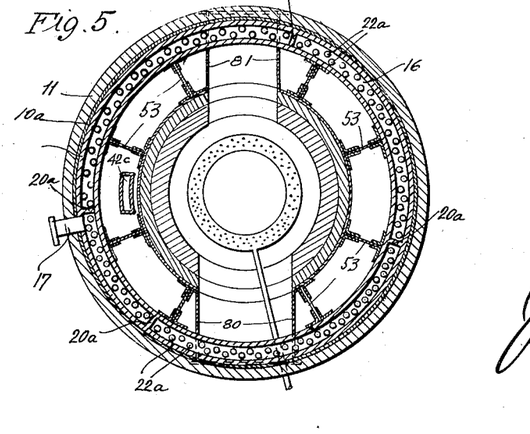
Fig. 5 is a transverse section on line 5—5 of Fig. 2.

Suitable fire brick lining 60 is placed within the lower interior of shell 54, supported on interior annular flange 61 at the bottom end of the shell. Within the fire box is a conventionally illustrated burner 67 which may be of any suitable design and which may burn either oil or gas. As shown in Fig. 5, shells 80 and 81 forming the firing door opening and manhole, respectively, extend through shells 10b and 54 into the fire box. Air to support combustion within the fire box is admitted to the bottom interior of the lower shell section through openings 63, the air being taken upwardly through the tubes of the lower section of trays, and being preheated by the hot residual liquid as will again be mentioned.

The liquid passing downwardly through the series of trays 30a surrounding the upper portion of shell 54, flows transversely in successively opposite directions across the trays, as hereinabove explained, and in contact with the exterior surface of the hot fire box shell. The liquid overflowing the lowermost tray through down spout 42c is conducted downwardly through the space between the brackets 53 by way of pipe 65, and is discharged into the uppermost tray of the lower evaporator section.

Extending through the upper end of the still is a hood 66 carrying the stack 67, the hood being supported on and welded to the top plate 37b of the uppermost evaporator tray. As clearly shown in Fig. 3, an expansion or slip joint generally indicated at 68, is provided between the hood 66 and the upper end 69 of the still, joint 68 consisting of a ring 70 surrounding the hood and carrying a suitable packing 71. Expansion joint 68 is provided to permit vertical movement of the hood through the upper end of the shell as longitudinal expansion or contraction occurs in the upper evaporator section 24a upon which the hood is supported.

I shall now describe the operation of the still assuming, as a typical example, that it is desired to produce pure distilled water from sea water. The raw feed water is first introduced to the condenser 12 through inlet 17, and after flowing through several passes through the condenser tubes as previously described, is discharged through outlet 18 into the uppermost tray in the evaporator. During its passage through the condenser, the feed is preheated so that at the point of discharge into the upper end of the evaporator, it will have become preheated to substantially boiling temperature. It may be mentioned that a particular advantage resides in the use of a multi-tubular condenser of the present type for preheating the feed, in that the liquid is maintained at a fairly high velocity flow through the tubes, and as a result sedimentary bodies or other corrosive solids, such as are contained in sea water, that may be precipitated from the liquid as a result of heating, are effectively swept up by the high velocity stream within the tubes and prevented from depositing on the walls thereof. During the downward passage of the preheated liquid through the trays of the upper evaporator section, the preheated water is subjected to further heating and vaporization by the hot gases flowing upwardly from the combustion chamber through the tubes 38, the rate and efficiency of heat transfer from the gases to the liquid being especially high by virtue of the arrangement of the tubes and the path of flow of the liquid around the tubes as hereinabove explained. It has been found that whatever solids are precipitated in the trays, are of finely divided or flocculent nature, as distinguished from a hard cake deposit, and may therefore be readily and easily removed from the trays. Any suitable means may be provided for removing sediment that may settle to the bottom of the trays, and as typical of such means, I have shown openings 84 to be drilled in the bottom of the tray bodies outside flanges 31b. Openings 84 will be of such size as to pass a comparatively small proportion of the liquid flowing through the trays, though sufficient to carry away the sediment. The vapors liberated in the evaporator trays pass into the vapor chamber 24 through the spaces between the sides of the trays and spaces 33 beneath flanges 32. The vapors are condensed on the condenser tubes 14, the condensate flowing downwardly over the surface of the tubes to the bottom of the liquid cooled condenser section, and thence flowing along the inner surface of the lower air cooled section 10b of the shell into trough 49, from whence the condensate is taken through outlet 50.

I may state at this point that the depth of the heating trays, or more properly the depth to which the liquid will be maintained thereon, will depend upon the particular liquid being distilled and its tendency to prime upon being heated to boiling temperature. I have found that for a given liquid containing substances which tend to cause or promote priming, there is a limiting maximum depth at which such liquid may be maintained without priming while subjected to boiling. Therefore, in order to preclude the possibility of the occurrence of priming in the trays, the latter will be designed in consideration of the particular liquid being distilled, so that the liquid will be maintained at a level below that at which priming can occur under the conditions of heating within the evaporator.

During its downward passage through the lower section the liquid is subjected to intimate and extended surface exposure flowing through the lower series of trays. As a result of such extended surface exposure the liquid is caused to undergo further vaporization at the expense of the sensible heat of the liquid, and the latter becomes cooled in giving up its sensible heat to supply the heat of vaporization. Further cooling of the residual liquid is brought about in preheating the air taken into the combustion chamber through the tubes of the lower evaporator section, to the advantage that the residual liquid leaving the still through outlet 48 is caused to approach the temperature of the feed being supplied the condenser, and that more efficient combustion in the fire box is favored by the preheated air supply.

Certain liquids such as raw sea water, may have a considerable content of dissolved or occluded air and other gases. Such gases will have become completely expelled from the liquid during the period of heating in the evaporator, and the gases will pass through the vaporous atmosphere surrounding the evaporator and will be discharged through one of the outlets at the base of the shell.

The high efficiency and economy which characterizes the operation of my improved still may be attributed primarily to two factors, first the high percentage of recovery of the heat of vaporization, or condensation, in preheating the feed, and second, the effecting of the maximum amount of vaporization within the evaporator for a given amount of heat input. Further discussion regarding the transference of the heat of condensation to the feed liquid need not be entered into since this has been taken up fully hereinabove. I shall however for the purpose of clearly explaining the operation whereby the second of the above mentioned features contributes to the high efficiency of the system, point out briefly the particular conditions of heating and vaporization occurring in the evaporator which bring about utilization of the heat supplied to the evaporator to vaporize a maximum portion of the liquid passing through the evaporator.

By confining the direct heating of the liquid by the hot gases to an upper section or length of the evaporator, in the manner described, a greater percentage of the liquid throughput is vaporized for a given amount of heat input, than would be the case should the liquid be heated throughout the entire length of the evaporator. This is due to the fact that after passing from the heated section of the evaporator, the liquid by virtue of its extended and intimate surface exposure in the lower section is caused to undergo further vaporization without additional heat input, at the expense of the sensible heat of the liquid. And this is evidenced by the fact that the temperature of the residual liquid, taking into consideration heat losses from the apparatus, taken from the still at the base is considerably lower than the normal boiling temperature of the liquid. Obviously, should the evaporator be subjected to heating throughout its entire length, the described advantage gained by first heating the liquid and then subjecting it to surface exposure without further heat input, would be lost.

I claim:

1. In a distillation apparatus, a liquid carrying condenser in tubular formation which directly surrounds an inner vapor space, an elongated evaporator extending longitudinally and centrally through the vapor space, means to feed liquid to be distilled to said condenser, means to direct the liquid from one end of the condenser to one end of said evaporator, means to direct the liquid longitudinally over the evaporator to its opposite end, and means for conducting hot gases longitudinally through the evaporator and out of contact with the liquid thereon, to heat and vaporize the liquid, vapors being liberated laterally from said evaporator along its length and passing directly through said vapor space to condense on the walls of said condenser.

2. In a distillation apparatus a liquid carrying condenser in tubular formation which directly surrounds an inner vapor space, an evaporator extending longitudinally and centrally through the vapor space, means to feed liquid to be distilled to said condenser, means to direct the liquid from one end of the condenser to one end of said evaporator, means to direct the liquid longitudinally over the evaporator to its opposite end, and means for conducting hot gases longitudinally through a part length only of the evaporator and out of contact with the liquid thereon, to heat and vaporize the liquid, vapors being liberated laterally from said evaporator along its length and passing directly through said vapor space to condense on the walls of said condenser.

3. Distillation apparatus comprising, a shell, a liquid carrying condenser in tubular formation within said shell and directly surrounding an inner vapor space, said condenser comprising a plurality of liquid carrying tubes arranged about said vapor space, an evaporator extending longitudinally and centrally through the vapor space, means to feed liquid to be distilled to the condenser, means to direct the liquid from one end of the condenser to one end of said evaporator, means to direct the liquid longitudinally over the evaporator to its opposite end, and means for supplying heat, independently of the liquid, to said evaporator along a portion of its extent within said condenser, vapors being liberated laterally from said evaporator along its length and passing directly through said vapor space to condense on the walls of said condenser.

4. Distillation apparatus comprising, a shell, a liquid carrying condenser in tubular formation within said shell and directly surrounding an inner vapor space, said condenser comprising a plurality of liquid carrying tubes arranged about said vapor space, an evaporator extending longitudinally and centrally through the vapor space, means to feed liquid to be distilled to the condenser, means to direct the liquid from one end of the condenser to one end of said evaporator, means to direct the liquid longitudinally over the evaporator to the opposite end, and means for conducting hot gases longitudinally through the evaporator, counter current to the flow of liquid therethrough and out of contact with the liquid, to heat and vaporize the liquid, vapors being liberated laterally from said evaporator along its length and passing directly through said vapor space to condense on the walls of said condenser.

5. Distillation apparatus comprising, a vertical shell, a liquid carrying condenser in tubular formation within said shell and directly surrounding an inner vapor space, said condenser comprising a plurality of vertical tubes extending longitudinally within the shell and arranged about said space, an evaporator extending longitudinally and centrally through the vapor space, means to feed liquid to be distilled to the tubes of said condenser, means to deliver the liquid from the upper end of the condenser directly to the upper end of said evaporator, means for directing the liquid downwardly over the evaporator, and means for conducting hot gases upwardly through the evaporator to heat and vaporize the downwardly flowing liquid, vapors being liberated laterally from said evaporator along its length and passing directly through said vapor space to condense on the walls of said condenser.

6. Distillation apparatus comprising, a vertical shell, a liquid carrying condenser in tubular formation within an upper portion and extending a part length of said shell, said condenser and a lower portion of the shell directly surrounding an inner elongated vapor chamber, an evaporator extending longitudinally and centrally through said vapor chamber and spaced from the wall of said condenser, means to direct the liquid to be distilled through said condenser, means to direct the liquid from the upper end of the condenser to the upper end of the evaporator, means for separately drawing off residuum and condensate from said evaporator and condenser respectively, and means for supplying heat to said evaporator.

7. Distillation apparatus comprising, a vertical shell, a liquid carrying condenser in tubular formation within an upper portion and extending a part length of said shell, said condenser and a lower portion of the shell directly surrounding an inner elongated vapor chamber, an evaporator embodying a heating section extending longitudinally and centrally through the upper portion only of said vapor chamber and spaced from the wall of said condenser, means to direct the liquid to be distilled through said condenser, means to direct the liquid from the upper end of the condenser to the upper end of the evaporator, means for separately drawing off residuum and condensate from said evaporator and condenser respectively, and means for supplying heat to said evaporator.

8. Distillation apparatus comprising, a vertical shell, a liquid carrying condenser in tubular formation within an upper portion of the shell, said condenser comprising a series of vertically extending tubes terminating in headers at their upper and lower ends, and said tube series and a lower portion of the shell directly surrounding an inner elongated vapor chamber, said lower portion of the shell being exposed to the atmosphere, an evaporator extending longitudinally and centrally through said vapor space, means to direct the liquid to be distilled to the lower of said headers and through the tubes, means to direct the liquid to be distilled from the upper header to the upper end of the evaporator, and means for supplying heat to said evaporator.

9. Distillation apparatus comprising, a vertical shell, a liquid carrying condenser in tubular formation within an upper portion of the shell, said condenser comprising a series of vertically extending tubes terminating in headers at their upper and lower ends, and said tube series and a lower portion of the shell directly surrounding an inner elongated vapor chamber, said lower portion of the shell being exposed to the atmosphere, an evaporator embodying a heating section extending longitudinally and centrally through the upper part only of said vapor space, means to direct the liquid to be distilled to the lower of said headers and through the tubes, means to direct the liquid to be distilled from the upper header to the upper end of the evaporator, and means for supplying heat to said evaporator.

10. In a distillation apparatus, a vertically extending liquid carrying condenser in tubular formation which directly surrounds an elongated inner vapor space, an evaporator extending longitudinally and centrally through said vapor space, means to feed liquid to be distilled to said condenser, means to direct the liquid from the upper end of the condenser to the upper end of said evaporator, means to direct the liquid downwardly over the evaporator, means providing a combustion chamber at a vertically intermediate point in said evaporator, and means for conducting hot gases from said combustion chamber upwardly through the portion of the evaporator above said chamber and out of contact with the liquid passing over the evaporator, to heat and vaporize the downwardly flowing liquid.

11. In a distillation apparatus, a vertically extending liquid carrying condenser in tubular formation which directly surrounds an elongated inner vapor space, an evaporator extending longitudinally and centrally through said vapor space, means to feed liquid to be distilled to said condenser, means to direct the liquid from the upper end of the condenser to the upper end of said evaporator, means to direct the liquid downwardly over the evaporator, means providing a combustion chamber at a vertically intermediate point in said evaporator, means for conducting hot gases from said combustion chamber upwardly through the portion of the evaporator above said chamber, to heat and vaporize the downwardly flowing liquid, and means for supplying air to the combustion chamber through the lower portion of the evaporator below said chamber whereby the air is preheated by the hot residual liquid.

12. In a distillation apparatus, a vertically extending liquid carrying condenser in tubular formation which directly surrounds an inner vapor space, an evaporator extending longitudinally and centrally through the vapor space, said evaporator comprising a vertical series of liquid carrying trays spaced from the wall of said condenser, means to feed liquid to be distilled to said condenser, means to direct the liquid from the upper end of said condenser to the uppermost of said evaporator trays, the liquid thence passing downwardly through the trays, a means for separably drawing off residuum and condensate from said evaporator and condenser respectively, means providing passages for conducting hot gases upwardly through said trays to heat and vaporize the liquid therein and means providing a combustion chamber communicating with said passage.

13. In a distillation apparatus, a vertically extending liquid carrying condenser in tubular formation which directly surrounds an inner vapor space, an evaporator extending longitudinally and centrally through the vapor space, said evaporator comprising a vertical series of liquid carrying trays each supported on the tray next below and spaced from the wall of said condenser, means to feed liquid to be distilled to said condenser, means to direct the liquid from the upper end of said condenser to the uppermost of said evaporator trays, the liquid thence passing downwardly through the trays, means for separately drawing off residuum and condensate from said evaporator and condenser respectively, means providing passages for conducting hot gases upwardly through said trays to heat and vaporize the liquid therein, and means providing a combustion chamber communicating with said passage.

14. In a distillation apparatus, a vertically extending liquid carrying condenser in tubular formation which directly surrounds an inner vapor space, an evaporator extending longitudinally and centrally through the vapor space, said evaporator comprising a series of vertically spaced heating floors, each floor comprising a pair of vertically spaced plates and a plurality of tubes extending between and terminating in said plates, the space between said plates being open to said vapor space, means enclosing the spaces between floors, means to feed liquid to be distilled to said condenser, means to direct the liquid from the upper end of said condenser to the uppermost floor of said evaporator, means for conducting the liquid thence downwardly between plates of each floor, and means for directing hot gases through the tubes of said floors out of contact with the liquid, to heat and vaporize the liquid, the liberated vapors being condensed on the walls of said condenser.

15. In a distillation apparatus, a vertically extending liquid carrying condenser in tubular formation which directly surrounds an inner vapor space, an evaporator extending longitudinally and centrally through the vapor space, said evaporator comprising a series of vertically spaced heating floors, each floor comprising a pair of vertically spaced plates and a plurality of tubes extending between and terminating in said plates, the space between said plates being open to said vapor space, means enclosing the spaces between floors, means to feed liquid to be distilled to said condenser, means to direct the liquid from the upper end of said condenser to the uppermost floor of said evaporator, means for conducting the liquid thence downwardly between plates of each floor, and means providing a combustion chamber at an intermediate longitudinal point in said evaporator, said combustion chamber communicating with the tubes of the heating floors thereabove, and means for delivering air into said chamber through the tubes of the floors below the chamber.

16. In apparatus of the character described, a vertically extending shell enclosing an inner vapor space, an evaporator extending longitudinally with said vapor space, said evaporator comprising a series of vertically spaced heating floors, each floor comprising a pair of vertically spaced plates and a plurality of tubes extending between and terminating in said plates, the space between said plates being open to said vapor space, means enclosing the spaces between floors, means to feed liquid to be distilled to said condenser, means to direct the liquid from the upper end of said condenser to the uppermost floor of said evaporator, means for conducting the liquid thence downwardly between plates of each floor, and means for directing hot gases through the tubes of said floors to heat and vaporize the liquid.

17. In apparatus of the character described, a vertically extending shell enclosing an inner vapor space, an evaporator extending longitudinally with said vapor space, said evaporator comprising a series of vertically spaced heating floors, each floor comprising a pair of vertically spaced plates and a plurality of tubes extending between and terminating in said plates, the space between said plates being open to said vapor space, means enclosing the spaces between floors, means to feed liquid to be distilled to said condenser, means to direct the liquid from the upper end of said condenser to the uppermost floor of said evaporator, means for conducting the liquid thence downwardly between plates of each floor, and means providing a combustion chamber at an intermediate longitudinal point in said evaporator, the hot gases being passed from said combustion chamber through the tubes of the heating floors thereabove to heat and vaporize the liquid, and air being taken into said chamber through the tubes of the floors below the chamber.

18. In a distillation apparatus, a vertically extending liquid carrying condenser in tubular formation which directly surrounds an inner vapor space, an evaporator extending longitudinally and centrally through the vapor space, said evaporator comprising a series of vertically spaced heating floors, each floor comprising a pair of vertically spaced plates and a plurality of tubes extending between and terminating in said plates, the tubes of successive floors being relatively staggered and the space between said plates being open to said vapor space, means enclosing the spaces between floors, means to feed liquid to be distilled to said condenser, means to direct the liquid from the upper end of said condenser to the uppermost floor of said evaporator, means to direct the liquid downwardly through and in successively opposite directions across said floors, and means for passing hot gases through the tubes of said floors to heat and vaporize the liquid, the liberated vapors being condensed on the walls of said condenser.

19. In apparatus of the character described, a vertically extending shell enclosing an inner vapor space, an evaporator extending centrally and longitudinally within said vapor space, said evaporator comprising a vertical series of spaced heating floors, each floor comprising a pair of vertically spaced plates, means for supplying heat to the spaces between floors, and means for passing liquid downwardly from floor to floor between the plates of the respective floors, including means for maintaining the liquid within each heating floor in contact with the upper plate of the floor.

20. In apparatus of the character described, a vertically extending shell enclosing an inner vapor space, an evaporator extending centrally and longitudinally within said shell, said evaporator comprising a vertical series of spaced heating floors, each floor comprising a pair of vertically spaced plates, means providing a combustion chamber at an intermediate longitudinal point in said evaporator, means for conducting hot gases from said chamber to the spaces between floors, and means for passing the liquid downwardly from floor to floor between the plates of the respective floors including means for maintaining the liquid in each floor above said combustion chamber in contact with the upper plate of the floor, and including means for maintaining the liquid in each floor below said chamber at a level below the upper plate to increase the evaporative surface of the liquid.

21. In a distillation apparatus, a vertically extending liquid carrying condenser in tubular formation which directly surrounds an inner vapor space, an evaporator extending longitudinally and centrally through the vapor space, said evaporator comprising a vertical series of heating floors spaced from the wall of said condenser, each floor comprising a pair of vertically spaced plates, means for supplying heat to the spaces between floors, and means for passing liquid downwardly from floor to floor between the plates of the respective floors, including means for maintaining the liquid within each heating floor in contact with the upper plate of the floor.

22. In a distillation apparatus, a vertically extending liquid carrying condenser in tubular formation which directly surrounds an inner vapor space, an evaporator extending longitudinally and centrally through the vapor space, said evaporator comprising a vertical series of spaced heating floors, each floor comprising a pair of vertically spaced plates, means providing a combustion chamber at an intermediate longitudinal point in said evaporator, means for conducting hot gases from said chamber to the spaces between floors, and means for passing the liquid downwardly from floor to floor between the plates of the respective floors including means for maintaining the liquid in each floor above said combustion chamber in contact with the upper plate of the floor, and including means for maintaining the liquid in each floor below said chamber at a level below the upper plate to increase the evaporative surface of the liquid.

23. In apparatus of the character described, an evaporator comprising a vertical series of liquid carrying trays, means to feed liquid to the uppermost tray, means to direct said liquid downwardly from tray to tray, means forming a combustion chamber, and means for conducting hot gases from said combustion chamber upwardly through said trays, and out of contact with the liquid thereon, to heat and vaporize the liquid.

24. In apparatus of the character described, an evaporator comprising a vertical series of liquid carrying trays, means to feed liquid to the uppermost tray, means to direct said liquid downwardly over the trays, means providing a combustion chamber at a vertically intermediate point in said evaporator, and means for conducting hot gases from said combustion chamber upwardly through the trays above said chamber, and out of contact with the liquid thereon, to heat and vaporize the liquid.

25. In apparatus of the character described, an evaporator comprising a vertical series of liquid carrying trays, means to feed liquid to the uppermost tray, means to direct said liquid downwardly over the trays, means providing a combustion chamber at a vertically intermediate point in said evaporator, means for conducting hot gases upwardly through the trays above said chamber to heat and vaporize the liquid therein, and means for taking air into said combustion chamber through the trays below said chamber whereby the air is preheated by the residual liquid.

26. In apparatus of the character described, a shell, an evaporator within said shell, said evaporator including a pair of vertically spaced plates, the space between the plates being enclosed and said plates being spaced from the shell, and a plurality of vertically extending tubes terminating in said plates, there being spaces surrounding said tubes and communicating with the space between said plates and the shell.

27. In apparatus of the character described, a shell, an evaporator comprising a vertical series of liquid heating trays within and spaced from said shell, each tray comprising, an annular body forming the sides of the tray, a pair of vertically spaced plates, the lower plate being joined to a lower portion of the body and the upper plate being joined to the bottom of the tray next above, and a plurality of vertically extending tubes terminating in said plates, the space between said plates communicating with the space between said tray and said shell.

28. In apparatus of the character described, an evaporator comprising a vertical series of liquid carrying trays, the sides of said trays sloping downwardly and inwardly, and the lower portion of the sloping side of each tray projecting downwardly within the tray next below and spaced from the sides thereof, and means projecting from the sides of the trays for supporting each tray on the upper edge of the tray next below.

29. In apparatus of the character described, an evaporator comprising a vertical series of liquid carrying trays, each tray comprising, an annular body having downwardly and inwardly sloping walls forming the sides of the tray and having an inwardly projecting bottom annular flange, a pair of vertically spaced plates, the lower plate being joined to the top of said flange, and the upper plate being joined to the bottom of the flange of the tray next above, a plurality of vertically extending tubes terminating in said plates; and means for supporting each tray on the one next below.

30. In apparatus of the character described, an evaporator comprising a vertical series of liquid carrying trays, each tray comprising, an annular body having downwardly and inwardly sloping walls forming the sides of the tray and having an inwardly projecting bottom annular flange, a pair of vertically spaced plates, the lower plate being joined to the top of said flange, and the upper plate being joined to the bottom of the flange of the tray next above, overflow conduits within opposite sides of successive trays, and means projecting from the sides of the trays for supporting each tray on the upper edge of the tray next below.

In witness that I claim the foregoing I have hereunto subscribed my name this 23rd day of April, 1930.

HENRY I. LEA.